US006780516B2

(12) United States Patent
Chen

(10) Patent No.: US 6,780,516 B2
(45) Date of Patent: Aug. 24, 2004

(54) ANTI-FOG COATING COMPOSITION, PROCESS, AND ARTICLE

(75) Inventor: Mao Chen, Evansville, IN (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/062,646

(22) Filed: Jan. 31, 2002

(65) Prior Publication Data

US 2003/0148113 A1 Aug. 7, 2003

(51) Int. Cl.[7] .............................. B32B 9/00; C08G 77/60
(52) U.S. Cl. ...................... 428/447; 428/323; 428/337; 428/423.1; 428/426; 428/429; 525/100; 525/446; 525/474; 528/35; 528/38; 528/43
(58) Field of Search ................................. 428/323, 337, 428/423.1, 426, 429, 447; 525/100, 446, 474; 528/35, 38, 43

(56) References Cited

U.S. PATENT DOCUMENTS

| 2,591,884 A | 4/1952 | Simon |
|---|---|---|
| 2,602,783 A | 7/1952 | Simon et al. |
| 2,621,166 A | 12/1952 | Schmidt et al. |
| 2,698,838 A | 1/1955 | Simon |
| 2,729,618 A | 1/1956 | Miiller et al. |
| 2,779,689 A | 1/1957 | Reis, Jr. |
| 2,808,391 A | 10/1957 | Pattison |
| 2,811,493 A | 10/1957 | Simon et al. |
| 2,833,730 A | 5/1958 | Barthel, Jr. |
| 2,850,476 A | 9/1958 | Seeger et al. |
| 2,866,762 A | 9/1958 | Brochhagen et al. |
| 2,866,774 A | 12/1958 | Price |
| 2,870,097 A | 1/1959 | Pattison |
| 2,877,212 A | 3/1959 | Seligman |
| 2,878,601 A | 3/1959 | Burmeister |
| 2,902,473 A | 9/1959 | Smith |
| 2,911,390 A | 11/1959 | Smith |
| 2,921,915 A | 1/1960 | Brochhagen et al. |
| 2,962,524 A | 11/1960 | Hostettler |
| 3,021,309 A | 2/1962 | Cox et al. |
| 3,021,317 A | 2/1962 | Cox et al. |
| 3,169,945 A | 2/1965 | Hostettler et al. |
| 3,383,351 A | 5/1968 | Stamberger |
| 3,933,407 A | 1/1976 | Tu et al. |
| 4,499,149 A * | 2/1985 | Berger ...................... 428/447 |
| 5,594,042 A | 1/1997 | Glover et al. |
| 5,708,057 A | 1/1998 | Morita et al. |
| 5,804,612 A | 9/1998 | Song et al. |
| 5,932,405 A * | 8/1999 | Anderson et al. ........... 430/527 |
| 6,057,034 A | 5/2000 | Yamazaki et al. |
| 6,087,051 A | 7/2000 | Shoji et al. |
| 6,242,058 B1 | 6/2001 | Bahadur et al. |
| 6,265,059 B1 | 7/2001 | Kono et al. |
| 6,296,694 B1 | 10/2001 | Miller |

FOREIGN PATENT DOCUMENTS

GB 733624 3/1953

* cited by examiner

Primary Examiner—Deborah Jones
Assistant Examiner—Ling X. Xu

(57) ABSTRACT

An anti-fog coating composition comprises a silicone polymer or oligomer, a water dispersible polyurethane polymer or oligomer, and water. A process for forming an anti-fog film comprises applying the anti-fog coating composition to a substrate and coalescing the silicone and polyurethane compounds to form the film. In another embodiment, the process for forming the anti-fog film comprises applying the components of the anti-fog coating composition to a substrate and crosslinking the components to form the anti-fog film. The components generally include a polyol, an isocyanate, a catalyst, and a silicone polymer or oligomer.

10 Claims, No Drawings

ANTI-FOG COATING COMPOSITION, PROCESS, AND ARTICLE

BACKGROUND OF THE INVENTION

The present disclosure relates to coating compositions, and more particularly, to coating compositions that form films exhibiting anti-fog and/or anti-condensation properties.

There are numerous instances in which optically clear articles would be enhanced if they were resistant to the formation of a fog on a surface of the article, for example, in window applications such as for greenhouses.

In general, fog and condensation formation occur under conditions of high humidity and high temperature or at interfacial boundaries where there is a large temperature and humidity difference. Coatings that reduce the tendency for surfaces to "fog up" have been reported. These so-called anti-fog coatings improve the wettability of a surface by allowing a thin layer of water film to form on the surface instead of discrete droplets. Known anti-fog coatings include, for example, coatings using ammonium soap, such as mixtures of an alkyl ammonium carboxylates with a surface active agent, for example, a sulfated or sulfonated fatty material; salts of sulfated alkyl aryloxypolyalkoxy alcohol; or alkylbenzene sulfonates. Other common anti-fog coating compositions use colloidal silica to provide water resistance. However, colloidal silica coating compositions generally have a high solvent content and are generally less effective for controlling condensation. Other common anti-fog compositions require chemical crosslinking to form a cohesive film. Although less solvent is used, the chemical crosslinking can significantly affect film properties. A highly crosslinked coating can cause the coated film to be brittle whereas low crosslinking can result in chalking, i.e., a powdery film that degrades or disperses upon contact with an aqueous solution.

Although the above noted coating formulations have addressed some of the problems in the field, none provides a total solution. Most of the formulations have low moisture absorptivity, long moisture release time, and/or poor water and solvent resistance. For example, water-soluble silicone resins synthesized from hydrophilic functional group-bearing silane compounds generally have poor water resistance, inadequate film hardness and poor weathering resistance. Some of these formulations also have inefficient fabrication processes, e.g. a long coat curing time. To be useful in most commercial applications, the anti-fog coating should possess high clarity, possess a long shelf life prior to coating, exhibit impact resistance properties suitable for the intended application, be able to absorb and release moisture simultaneously, and be able to resist water and conventional organic solvents, such as alcohols, alkylbenzenes (e.g., toluene), glycol ethers (e.g., propylene glycol monomethyl ether), and alkyl ketones (e.g., methyl ethyl ketone).

SUMMARY OF THE INVENTION

Disclosed herein is an anti-fog coating composition comprising a silicone compound, a water dispersible polyurethane compound, and water.

A process for forming an anti-fog film on a substrate comprises applying an aqueous coating composition to the substrate, wherein the aqueous coating composition comprises a silicone compound, a water dispersible polyurethane compound, and water; and coalescing the silicone compound and polyurethane compound to form a film.

In another embodiment, a process for forming an anti-fog film comprises applying a coating composition to a substrate, wherein the coating composition comprises a silicone compound, an isocyanate, a polyol and a catalyst; and crosslinking the coating composition to form a film, wherein crosslinking comprises heating the substrate to a temperature and for a time effective to form the film.

A glass or plastic article having an anti-fogging surface comprises a glass or plastic substrate and an anti-fog coating disposed on at least one surface of the substrate, the anti-fog coating comprising a silicone compound, a water dispersible polyurethane compound, and water.

In another embodiment, glass or plastic article having an anti-fogging surface comprises a glass or plastic substrate; and an anti-fog coating disposed on at least one surface of the substrate, the anti-fog coating comprising a crosslinked film formed from a silicone, an isocyanate, a polyol and a catalyst.

These and other features will be apparent from the following detailed description.

DETAILED DESCRIPTION OF THE INVENTION

An anti-fog, water based coating composition is obtained by combining a silicone compound having a hydrophilic functional group with a water dispersible polyurethane compound. A film formed from the anti-fog coating composition is primarily formed by coalescence, a process that causes the silicone and polyurethane compounds to flow into each other and form a continuous film. Advantageously, the resulting films exhibit, among others, low solvent retention, durability, and flexibility.

In general, a formulation of the coating composition comprises a silicone polymer or oligomer, a water dispersible polyurethane polymer or oligomer, and water. The silicone polymer or oligomer is about 0.1 to about 20 parts by weight of the formulation, with about 1 to about 10 parts by weight more preferred, and with about 1 to about 5 parts by weight even more preferred. The water dispersible polyurethane polymer or oligomer is about 5 to about 50 parts by weight of the formulation, with about 10 to about 40 parts by weight more preferred, and with about 20 to about 30 parts even more preferred. The remainder of the formulation comprises an aqueous solvent, i.e., water and an optional co-solvent miscible with water. Any co-solvent included in the formulation is preferably about 1 to about 10 parts per weight and more preferably, about 5 to 10 parts by weight of the formulation. The sum of the weights of the compounds preferably totals 100 parts by weight. Of course, other compounds (such as a UV absorbers, tight stabilizers, pigments, dyes, etc.) may be added to or omitted from a formulation, in which case the relative amounts of each of the compounds would be adjusted accordingly to total 100 parts by weight, as would be apparent to one skilled in the art in view of this disclosure.

The term silicone as used herein includes polymers or oligomers of organosiloxanes (and moieties derived therefrom) wherein each organo group is independently selected from the group consisting( of alkyl groups such as $C_1$ to $C_{12}$ alkyl groups, for example. At least one or more of the organo groups contain one or more hydrophilic functional groups. Any hydrophilic functional group may be used. Examples of suitable hydrophilic functional groups include —$CO_2H$; —OH; —NH; oxyethylene segments, other nitrogen containing organic functional groups, —SH; ester, urethane, and isocyanate groups. In a preferred embodiment, functional group is a weak acid group. It is preferred that the silicone polymer or oligomer does not include strong acids such as sulfonic acid functional groups. The presence of strong acids such as the sulfonic acid groups in the silicone polymer or oligomer (and the amines that are commonly used to neutralize the acid) can degrade the polymer film formed from the coating composition, cause discoloration result in poor weathering performance, or result in a film exhibiting high water sensitivity. The preferred functional groups provide room temperature curing sites for film coalescence, act as dispersing aids by lowering the surface energy of the aqueous dispersion, and/or lower the minimum film forming temperature.

Preferred silicone resins are organosiloxanes, free from sulfonic acid functional groups, having the general formula:

$$M_a M'_b D_c D'_d T_e T'_f Q_g,$$

wherein the subscripts a, c, d, e, f, and g are zero or a positive integer, subject to the limitation that the sum of the subscripts b, d, and f is one or greater: M has the formula: $R^1_3 SiO_{1/2}$, where each $R^1$ is independently a monovalent hydrocarbon radical having from one to forty carbon atoms; M' has the formula: $R^2_{3-h} R^3_h SiO_{1/2}$, wherein each $R^2$ and $R^3$ are independently monovalent hydrocarbon radicals having from one to forty carbon atoms, and the subscript h is 1, 2, or 3; D has the formula: $R^4_2 SiO_{2/2}$, wherein each $R^4$ is independently a monovalent hydrocarbon radical having from one to forty carbon atoms; D' has the formula: $R^5_{2-i} R^6_i SiO_{2/2}$, wherein each of $R^5$ and $R^6$ is independently a monovalent hydrocarbon radical having from one to forty carbon atoms, and the subscript i is 1 or 2; T has the formula: $R^7 SiO_{3/2}$, wherein each $R^7$ is a monovalent hydrocarbon radical having from one to forty carbon atoms; T' has the formula: $R^8 SiO_{3/2}$, wherein $R^8$ is a monovalent hydrocarbon radical having from one to forty carbon atoms; and Q has the formula: $SiO_{4/2}$.

More preferably, the silicone is an ionic or nonionic siloxane alkoxylate having the general formula:

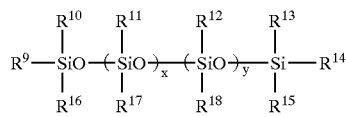

wherein each of $R^{9-17}$ are independently a monovalent hydrocarbonyl radical $R^{18}$ is of the general formula: $R^{19}$—Z—$(C_m H_{(2m-1)} R^{20} O)_j (C_n H_{2n} O)_k R^{21}$, m and n are integers greater than or equal to 0; j and k are integers greater than or equal to 0, subject to the proviso that the sum of j+k is greater than or equal to 1; Z is —O—, —S—, —CO—, —NH, or —NH$_2$—; $R^{19}$ is a divalent hydrocarbylene radical, $R^{20}$ and $R^{21}$ are independently hydrogen, alkyl, hydroxyalkyl, amino, amido, amineoxide, cyano, isocyano, aryl, arylene, carboxy, alkoxy, halogen, haloalkyl, haloalkoxy, sulfo, sulfamo, plosphono, salts thereof, or a combination comprising at least one of the foregoing, and the like; and wherein x and y are integers greater than or equal to 0, subject to the proviso that x+y is greater than or equal to 1.

Preferred silicone resins are polydimethylsiloxanes. Exemplary polydimethylsiloxanes include, but are not limited to, poly[dimethylsiloxane-co-methyl(3-hydroxypropyl) siloxane]-graft-poly(ethylene glycol) methyl ether, poly [dimethylsiloxane-co-[3-[2-(2-hydroxyethoxy)ethoxy] propyl]methylsiloxane, poly[dimethylsiloxane-co-(3-aminopropyl)methylsiloxane], poly[dimethylsiloxane-co-methyl(3-hydroxypropyl)siloxane]-graft poly(ethylene/propylene glycol) methyl ether, poly[dimethylsiloxane-co-methyl(3-hydroxypropyl)siloxane]-graft-tetrakis(1,2-butylene glycol), poly(dimethylsiloxane-co-alkyl methylsiloxane), poly[dimethylsiloxane-co-methyl (stearoyloxyalkyl)siloxane], poly[dimethylsiloxane-co-methyl(3-hydroxypropyl)siloxane]-graft-poly(ethylene/propylene glycol), poly[dimethylsiloxane-co-methyl(3-hydroxypropyl)siloxane]-graft-poly(ethylene glycol) [3-(trimethylammonio)propyl chloride, poly[dimethylsiloxane-co-methyl(3-hydroxypropyl)siloxane]-graft-poly(ethylene glycol) 3-aminopropyl ether, poly[dimethylsiloxane-co-methyl(3,3,3-trifluoropropyl)siloxane], poly (dimethylsiloxane bis[[3-[(2-aminoethyl)amino]propyl] dimethoxysilyl]ether, and poly(dimethylsiloxane) ethoxylate/propoxylated.

The term water dispersible polyurethane, generally refers to a polymeric or oligomeric material, the backbone of which comprises a multiplicity of urethane linkages, ——O——CO——NH——, and may also contain one or more urea linkages: ——NH——CO——NH——, and may also contain one or more thiocarbamate linkages: ——S——CO——NH——and combinations thereof.

The water dispersible polyurethanes are preferably formed from compositions comprising an organic isocyanate component reactive with an active hydrogen-containing component(s), and a catalyst.

The organic isocyanate components used in the preparation of the water dispersible polyurethane preferably are those having the general formula:

$$Q(NCO)_i$$

wherein i is an integer of two or more and Q is an organic radical having a valence of i, wherein i is greater than 2. Q can be a substituted or unsubstituted hydrocarbon group (i.e., an alkylene or an arylene group). Q can be a group having the formula $Q^1$—Z—$Q^1$ wherein $Q^1$ is an alkylene or arylene group and Z is —O—, —O—$Q^1$—S—, —C(O)—, —S—, —S—$Q^1$—S—, —SO— or —SO$_2$—. Examples of such compounds include hexamethylene diisocyanate, 1,8-diisocyanato-p-methane, xylyl diisocyanate. diisocyanatocyclohexane, phenylene diisocyanates, tolylene diisocyanates, including 2,4-tolylene diisocyanate, 2,6-tolylene diisocyanate, and crude tolylene diisocyanate, bis (4-isocyanatophenyl)methane, chlorophenylene diisocyanates, diphenylmethane-4,4'-diisocyanate (also known as 4,4'-diphenyl methane diisocyanate, or MDI) and adducts thereof, naphthalene-1,5-diisocyanate. triphenylmethane-4,4',4"-triisocyanate, isopropylbenzene-alpha-4-diisocyanate, and polymeric isocyanates such as polymethylene polyphenylisocyanate.

The active hydrogen-containing component includes polyhydroxyl-containing compounds, such as hydroxyl-terminated polyhydrocarbons (U.S. Pat. No. 2,877,212); hydroxyl-terminated polyformals (U.S. Pat. No. 2,870,097); fatty acid triglycerides (U.S. Pat. Nos. 2,833,730 and 2,878, 601); hydroxyl-terminated polyesters (U.S. Pat. Nos. 2,698, 838, 2,921,915, 2,591,884, 2,866,762, 2,850,476, 2,602,783, 2,729,618, 2,779,689, 2,811,493, and 2,621,166); hydroxymethyl-terminated perfluoromethylenes (U.S. Pat. Nos. 2,911,390 and 2,902,473); polyalkylene ether glycols (U.S. Pat. No. 2,808,391 British Pat. No. 733,624); polyalkylene ether glycols (U.S. Pat. No. 2,808,391; British Pat. No. 733,624); polyalkylenearylene ether glycols (U.S. Pat. No. 2,808,391); polycarbonate polyol (U.S. Pat. Nos. 6,087, 051 and 6,057,034) and polyalkylene ether triols (U.S. Pat. No. 2,866,774).

Preferred polyhydroxyl-containing materials are the polycaronate polyols and polyether polyols. The polycarbonate polyols may be, for example, polycarbonatediols which are obtainable by a reaction of a short chain dialkylcarbonate and a component selected from aforementioned polyether polyols, polyesterpolyols, and diol components such as 2-methylpropanediol, dipropylene glycol, 1,4-butanediol, 1,6-hexanediol, 3-methyl-],5-pentanediol, neopentyl glycol, 1,5-octanediol, 1,4-bis-(hydroxymethyl)cyclohexane, and the like. The short chain dialkylcarbonate may be $C_{1-4}$ alkylcarbonates such as, for example, dimethylcarbonate and diethylecarbonate. Examples of commercially available polycarbonate diol may be DESMOPHENE 2020E (manufactured by Sumitomo Bayer Co., Ltd.), DN-980, DN-982 and DN-983 (manufactured by Japan Polyurethane Industry Co., LTD).

Polyether polyols may be obtained by the chemical addition of alkylene oxides, such as ethylene oxide, propylene oxide and mixtures thereof to water or polyhydric organic compounds, such as ethylene glycol, propylene glycol, trimethylene glycol, 1,2-butylene glycol, 1,3-butanediol, 1,4-butanediol, 1,5-pentanediol, 1,2-hexylene glycol 1,10-decanediol, 1,2-cyclohexanediol, 2-butene-1,4-diol, 3-cyclohexene-1,1-dimethanol, 4-methyl-3-cyclohexene-1, 1-dimethanol, 3-methylene-1,5-pentanediol, diethylene glycol, (2-hydroxyethoxy)-1-propanol, 4-(2-hydroxyethoxy)-1-butanol, 5-(2-hydroxypropoxy)-1-pentanol,1-(2-hydroxymethoxy)-2-hexanol, 1-(2-hydroxypropoxy)-2-octanol, 3-allyloxy-1.5-pentanediol, 2-allyloxymethyl-2-methyl-1,3-propanediol, [4,4-pentyloxy)-methyl]-1,3-propanediol, 3-(o-propenylphenoxy)-1,2-propanediol, 2,2'-diisopropylidenebis(p-phenyleneoxy)diethanol, glycerol, 1,2,6-hexanetriol, 1,1,1-trimethylolethane, 1,1,1-trimethylolpropane, 3-(2-hydroxyethoxy)-1,2- propanediol, 3-(2-hydroxypropoxy)-1,2-propanediol, 2,4-dimethyl-2-(2-hydroxyethoxy)-methylpentanediol-1,5; 1,1,1-tris[2-hydroxyethoxy) methyl]-ethane, 1,1,1-tris[2-hydroxypropoxy)-methyl] propane, diethylene glycol, dipropylene glycol, pentaerythritol, sorbitol, sucrose, lactose, alpha-methylglucoside, alpha-hydroxyalkylglucoside, novolac resins, phosphoric acid, benzenephosphoric acid, polyphosphoric acids such as tripolyphosphoric acid and tetrapolyphosphoric acid, ternary condensation products, and the like. The alkylene oxides employed in producing polyoxyalkylene polyols normally have from 2 to 4 carbon atoms. Propylene oxide and mixtures or propylene oxide with ethylene oxide are preferred. The polyols listed above can be used per se as the active hydrogen compound.

A preferred class of polyether polyols is generally represented by the following formula:

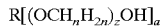

$$R[(OCH_nH_{2n})_zOH]_a$$

wherein R is hydrogen or a polyvalent hydrocarbon radical, a is an integer (i.e., 1 or 2 to 6 to 8) equal to the valence of R, n in each occurrence is an integer from 2 to 4 inclusive (preferably 3) and z in each occurrence is an integer having, a value of from 2 to about 200, preferably from 15 to about 100.

Additional active hydrogen-containing compounds are the polymers of cyclic esters. The preparation of cyclic ester polymers from at least one cyclic ester monomer is well documented in the patent literature as exemplified by U.S. Pat. Nos. 3,021,309 through 3,021,317, 3,169,945, and 2,962,524. Suitable cyclic ester monomers include, but are not limited to, delta-valerolactone; epsilon-caprolactone; zeta-enantholactone; the monoalkyl-valerolactones, e.g. the monomethyl-, monoethyl-, and monohexyl-valerolactones.

Cyclic ester/alkylene oxide copolymers can also be prepared by reacting a mixture comprising cyclic ester and alkylene oxide monomers, an interfacial agent such as a solid, relatively high molecular weight poly(vinylstearate) or lauryl methacrylate/vinyl chloride copolymer (reduced viscosity in cyclohexanone at 30° C. from about 0.3 to about 1.0), in the presence of an inert normally-liquid saturated aliphatic hydrocarbon vehicle such as heptane and phosphorus pentafluoride as the catalyst therefore, at an elevated temperature, e.g., about 80° C.

Another type of active hydrogen-containing materials are the polymer polyol compositions obtained by polymerizing ethylenically unsaturated monomers in a polyol as described in U.S. Pat No. 3,383,351. Suitable monomers for producing such compositions include acrylonitrile, vinyl chloride, styrene, butadiene, vinylidene chloride and other ethylenically unsaturated monomers as identified and described in the above-mentioned U.S. patent. The polymer polyol compositions can contain from 1 to about 70 weight percent (wt %), preferably about 5 to about 50 wt %. and most preferably about 10 to about 40 wt % monomer polymerized in the polyol. Such compositions are conveniently prepared by polymerizing the monomers in the selected polyol at a temperature of about 40° C. to about 150° C. in the presence of a free radical polymerization catalyst such as peroxides, persulfates, percarbonate, perborates and azo compounds.

The exact polyol or polyols employed depends upon the desired characteristics of the polyurethane. In particular, variation in the polyol component and the structure of the amine in the chain extension process for forming the polyurethane can yield a wide range of moduli and toughness.

Catalysts include various inorganic metal compounds and metal compounds that include certain organic groups. Metal acetyl acetonates are preferred, based on metals such as aluminum, barium, cadmium, calcium, cerium (III), chromium (III), cobalt (II), cobalt (II), copper (II), indium, iron (II), lanthanum, lead (II), manganese (II), manganese (III), neodymium, nickel (II), palladium (II), potassium, samarium, sodium, terbium, titanium, vanadium, yttrium, zinc and zirconium. A common catalyst is bis(2,4-pentanedionate) nickel (II) (also known as nickel acetylacetonate or diacetylacetonate nickel) and derivatives thereof such as diacetonitrilediacetylacetonato nickel, diphenylnitirilediacetylacetonato nickel, bis(triphenylphosphine)diacetyl acetylacetonato nickel, and the like.

Optionally, the water dispersible polyurethane may contain additional water dispersible components such as an acrylate, polyester or the like. Alternatively, these moieties may be chemically attached to the polyurethane to prevent phase separation or other film coating defect.

Suitable commercially available water dispersible polyurethanes include BAYHYDROL 121 available from Baser Corporation, WITCOBOND available from Witco Corporation, Q-THANE available from K J Quinn. Inc., K-FLEX available from King Industries, and FLEXANE available from the Air Products and Chemicals, Inc.

Depending on the particular silicone polymer or oligomer, the use of the co-solvent may be employed. Suitable co-solvents include N-methyl pyrrolidone, glycol ethers, isopropanol and combinations comprising, at least one of the foregoing co-solvents. In a preferred embodiment, the co-solvent is N-methyl pyrrolidone.

The coating compositions can additionally contain other additives and adjuvants, such as adherence modulators (linear silicone polymers or resins bearing vinyl, epoxy, vinyl ether, alcohol and the like functional groups), pigments (for example titanium dioxide and iron oxide), photosensitizing agents, fillers (alumina trihydrate, silica, talc, calcium carbonate, clay, and the like), dyes fungicidal, bactericidal and anti-microbial agents, antistatic agents, particulates which control the friction or surface contact areas, defoamers, buffers to control ply of the coating compositions, corrosion inhibitors and the like. Use of UV absorbers or light stabilizers, such as hindered amine light stabilizers, can be used to further impart UV resistance. Other additives may also be used, if desired.

The formulations are prepared by admixing the components together. Preferably, the formulations are prepared by adding a dilute silicone polymer or oligomer solution or dispersion to the water dispersible polyurethane dispersion. Water and/or additional co-solvent is then added to achieve the desired solids content and viscosity. The additives and adjuvants, if present, may be added at any stage of the mixing process.

In another embodiment, the anti-tog coating composition is prepared by admixing the silicone polymer or oligomer with the components that form the water dispersible polyurethane, i.e., polyol, isocyanate and catalyst in a suitable solvent, coating a solution of the admixture, and curing the coated formulation to form a crosslinked film.

In another embodiment, the anti-fog coating formulation is prepared by admixing the silicone polymer or oligomer with the components that form the water dispersible polyurethane, i.e., polyol, isocyanate and catalyst, coating a substrate with the dispersion, and curing the coated formulation to form a coalesced film. In this embodiment, the silicone polymer or oligomer preferably comprises a functional group that is preferably a weak acid, e.g., a carboxylic acid moiety. In this manner, the silicone component is chemically attached to the polyurethane and the resulting film is formed by coalescence. Advantageously, physical loss due of the silicone compound due to evaporation or the like is prevented.

Any number of coating methods may be employed to coat the anti-fog coating composition onto a surface of a desired substrate, for example, roller coating, wire-bar coating, dip coating, extrusion coating, air knife coating, curtain coating, slide coating, blade coating, doctor coating, or gravure coating.

Preferably, the coated film is heat treated to form the coalesced or crosslinked polymeric network. Suitable temperatures for forming the coalesced or crosslinked polymeric network in the coating composition are preferably at about room temperature to about 150° C., with 50° C. to 130° C. more preferred and with 100° C. to about 120° C. even more preferred. The duration of heating should be effective to form the film and is preferably about 2 to about 60 minutes. These temperatures and times are not intended to be limiting, however, since those of ordinary skill in the art will recognize that the temperatures and times utilized will vary according to the actual physical characteristics of the formed coating (e.g., coating layer thickness, additives, ratios of components, etc.). Even so, as a general rule, the higher the treating temperature utilized, the more quickly the coalesced polymeric network forms in the coating composition.

The coat weight of the anti-fog coating is not particularly restricted, but should generally be in the range from about 0.5 g/m$^2$ to about 15 g/m$^2$ depending on the film thickness. For most applications, the thickness of the coating is preferably at about 0.5 to about 15 micrometers.

The coatings are typically used to provide anti-fog properties to a surface of a substrate, wherein the substrate comprises a plastic or glass material. Suitable plastic materials include polyester, cellulose esters polycarbonate, polystyrene, poly(vinyl acetate), polyolefins, and the like. The substrate thickness is not particularly restricted, and usually depends entirely upon the application. Typical thicknesses are about 0.005 inches to about 0.5 inches or monolithic structures, and about 4 millimeter to about 16 millimeters for structured substrates. The substrate may be pretreated to enhance adhesion of the anti-fog coating.

The following examples illustrate the disclosure without limitation. All parts are given by weight unless otherwise indicated.

EXAMPLE 1

An anti-fog coating formulation is as follows.

| Component | Amount (grams) |
| --- | --- |
| Polyol (RUCOFLEX S-1028) | 20.0 |
| Polyisocyanate (DESMODUR N-75) | 10.0 |
| Silicone (poly[dimethylsiloxane-co-[3-[2-(hydroxyethoxy)ethoxy]propyl]methyl-siloxane) | 4.0 |
| Catalyst (dibutylin dilaurate) | 0.05 |
| Diacetone alcohol | 6.0 |
| t-Butanol | 60.0 |

The formulation was applied to a polycarbonate substrate and dried in an oven at an elevated temperature forming a crosslinked film. The anti-fog film formed on the polycarbonate substrate exhibited improved flexibility e.g., elongation was greater than 50%.

EXAMPLE 2

An anti-fog coating formulation is as follows.

| Component | Amount (grams) |
| --- | --- |
| Polypropylene glycol diol (Mol. Wt. ~1000, ARCO) | 22.5 g |
| Hydrogenated diphenyl methane diisocyanate | 9.8 g |
| Dimethylol propionic acid | 1.25 g |
| Diethylene triamine | 0.63 g |
| Triethylamine | 0.92 g |
| N-methyl-pyrrolidinone | 16.5 g |
| Poly[dimethylsiloxane-co-methyl(3-hydroxypropyl)siloxane-graft-[poly(ethylene glycol) methyl ether]-[poly(ethylene glycol) | 4.0 g |
| Dibutyltin dilaurate | 0.05 g |
| Water | 44.4 g |

In this example, the silicone compound is chemically attached to the polyurethane during formation of an aqueous dispersion. Polypropylene glycol diol, dimethylol propionic acid (dissolved in ⅓ of the N-methyl-pyrrolidinone), and dibutyltin dilaurate are charged into a reactor with temperature control under a nitrogen environment at a temperature about 80° C. Hydrogenated diphenyl methane diisocyanate is added slowly to the reactor and the reaction is continued for 3 hours until the theoretical NCO % is reached. The reaction mixture is then cooled to 60° C. Triethylamine is then added to neutralize the acid functionalities. Water is then added with vigorous agitation to form the dispersion. To this a diethylene triamine/N-methyl-pyrrolidinone/water solution is added to complete chain extension and the reaction is kept for 2 hours. The resulting polyurethane dispersion had a solids content of about 35 to about 40-weight %.

The dispersion is then applied to a substrate and dried at an elevated temperature in an oven. The resulting film is formed by coalescence and exhibited anti-fog properties.

EXAMPLE 3

An anti-fog coating formulation is as follows.

| Component | Amount (grams) |
|---|---|
| Silicone compound (poly[dimethylsiloxane-co-[3-[2-(hydroxyethoxy)ethoxy]propyl]methyl-siloxane) | 2 |
| Polyurethane Aqueous Dispersion (BAYHYDROL 121) | 58 |
| UV Absorber (TINUVIN 400, Ciba Specialty Chemicals) | 1.5 |
| UV Light Stabilizer (UVENUL 3058, BASF Corp.) | 0.05 |
| Water | 38.45 |

The coating composition of Example 2 was applied at a thickness of about 8 micrometers to a polycarbonate film and dried at 130° C. for 30 minutes. The properties of the coated substrate were evaluated and are summarized in Table 1.

TABLE 1

| TEST | RESULTS |
|---|---|
| Fogging Time | Greater than 60 seconds |
| Sheeting Performance | No bead or droplet formation |
| Xenon Arc accelerated weathering | YI ≦ about 2, no delamination after 3000 hours |
| QUVB (FS-40) accelerated weathering | YI ≦ about 6, no delamination after 3000 hours |
| Impact Resistaiice | ≧ about 160 to about 200 pounds |

Fogging time is expressed as the time it takes to visually form a fog on a surface of the coating by placing the coating T inch above a vessel of water (coating surface facing the water). The water was heated to a temperature of 55° C. No fogging was observed after 60 seconds of exposure.

Sheeting performance is a qualitative measure of the anti-condensation properties commonly used for measuring the applicability of the product for greenhouse window applications. A stream of water is applied to the coated surface at a 45° angle and its flow pattern is observed. If the water flow forms a continuous path, the performance is considered acceptable. In contrast, if the water forms a bead or droplets upon the surface, the performance is considered unacceptable. Acceptable sheeting performance was observed for the coated substrate.

The weatherability testing, included exposing the coated surface of the substrate to a xenon arc light source or a QUVB light source. An Atlas Ci35 Xenon Arc weatherometer was employed for exposing the coating to the xenon light source and included a borosilicate glass filter element for filtering wavelengths less than about 290 nanometers. The weathering cycle included a 160-minute exposure at 70° C. and 50% relative humidity followed by a 5 minute cool down in the dark and a 15-minute water spray. The average irradiance was 0.77-watts/square meter at 340 nanometers. The weathering cycle was continuously repeated for a period of 3000 hours. Under these conditions, the yellowing index (YI) indicated that yellowing was minimal. Moreover, the coated samples did not show any visible signs of delamination.

The QUVB weathering device was outfitted with an FS40 lamp. Samples were disposed in the chamber of the device. The weathering cycle included exposure to the FS40 lamp for a period of 8 hours at 70° C. followed by 4 hours of dark time at 50° C. The weathering cycle was continuously repeated for a total time period of 3000 hours. No delamination was observed after exposure and yellowing was minimal.

The impact resistance was measured in accordance with ASTM D2794. The test was conducted on a 10 mil double wall polycarbonate sheet with a coating thickness of 8 microns. The results clearly show that the use of polyurethane in the coating composition maintains the impact resistance of the coated sample. Impact resistance was greater than 160–200 pounds.

Advantageously, the coating compositions can be used to form films exhibiting excellent anti-fog and anti-condensation properties. Moreover, the coating compositions show fast drying behavior resulting in improved productivity cycles, use less solvent usage than prior art compositions, show less degradation during extrusion, and maintain sufficient impact strength for use in numerous applications.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teaching s of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An anti-fog coating composition comprising a silicone compound free from a sulfonic acid functional group; a water dispersible polyurethane compound; and an aqueous solvent, wherein the silicone compound is of the formula:

$$M_a M'_b D_c D'_d T_e T'_f Q_g,$$

wherein the subscripts a, c, d, e, f, and g are zero or a positive integer, subject to the limitation that the sum of the subscripts b, d, and f is one or greater; M has the formula: $R^1{}_3 SiO_{1/2}$, wherein each $R^1$ is independently a monovalent hydrocarbon radical having from one to forty carbon atoms; M' has the formula: $R^2{}_{3-h} R^3{}_h SiO_{1/2}$, wherein each $R^2$ and $R^3$ are independently monovalent hydrocarbon radicals having from one to forty carbon atoms, and the subscript h is 1, 2, or 3; D has the formula: $R^4{}_2 SiO_{2/2}$, wherein each of $R^4$ is independently a monovalent hydrocarbon radical having from one to forty carbon atoms; D' has the formula: $R^5{}_{2-i} R^6{}_i SiO_{2/2}$, wherein each of $R^5$ and $R^6$ is independently a monovalent hydrocarbon radical having from one to forty carbon atoms, and the subscript i is 1 or 2; T has the formula: $R^7 SiO_{3/2}$, wherein each $R^7$ is a monovalent hydrocarbon radical having from one to forty carbon atoms; T' has the formula $R^8 SiO_{3/2}$, wherein $R^8$ is a monovalent hydrocarbon radical having from one to forty carbon atoms; and Q has the formula: $SiO_{4/2}$, or an ionic or nonionic siloxane alkoxylate of the formula:

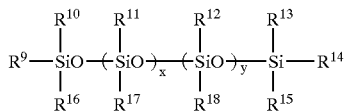

wherein each of $R^9$ through $R^{17}$ are independently a monovalent hydrocarbon radical, and $R^{18}$ is $R^{19}$—Z—$(C_mH_{(2m-1)}R^{20}O)_j(C_nH_{2n}O)_kR^{21}$, wherein m and n are integers greater than or equal to 0; j and k are integers greater than or equal to 0, subject to the proviso that the sum of j+k is greater than or equal to 1; Z is —O—, —S—, —CO—, —NH—, or —NH$_2$—; $R^{19}$ is a divalent hydrocarbylene radical, $R^{20}$ and $R^{21}$ are independently hydrogen, alkyl, hydroxyalkyl, amino, amide, amineoxide, cyano, isocyano, aryl, arylene, carboxy, alkoxy, halogen, haloalkyl, haloalkoxy, sulfo, sulfarno, phosphono, salts thereof, or a combination comprising at least one of the foregoing moieties, and wherein x and y are integers greater than or equal to 0, subject to the proviso that x+y is greater than or equal to 1.

2. The coating composition according to claim 1, further comprising an additive, wherein the additive is a UV absorber, an antistatic agent, pigments, photosensitizing agents, fillers, dyes, fungicidal, bactericidal and anti-microbial agents, particulates which control the friction or surface contact areas, defoamers, buffers to control pH of the coating compositions, corrosion inhibitors, or a combination comprising at least one of the foregoing additives.

3. The coating composition according to claim 1, further comprising a co-solvent, wherein the co-solvent is N-methyl pyrrollidone, glycol ether, isopropanol, or a combination comprising at least one of the foregoing co-solvents.

4. The coating composition according to claim 3, wherein the co-solvent present in the coating composition is about 5 to about 10 parts by weight based on the total weight of the coating composition.

5. The coating composition according to claim 1, wherein the silicone compound is chemically bound to the polyurethane compound.

6. The coating composition according to claim 1, wherein the silicone compound is present in the coating composition at about 0.1 to about 20 parts by weight and the water dispersible polyurethane polymer is present at about 5 to about 50 parts by weight based on 100 parts by weight total of silicone compound, water dispersible polyurethane, and the aqueous solvent.

7. The coating composition according to claim 1, wherein the silicone compound is poly[dimethylsiloxane-co-methyl(3-hydroxypropyl)siloxane]-graft-poly(ethylene glycol) methyl ether; poly[dimethylsiloxane-co-[3-[2-(2-hydroxyethoxy)ethoxy]propyl]methylsiloxane; poly[dimethylsiloxane-co-(3-aminopropyl)methylsiloxane]; poly[dimethylsiloxane-co-methyl(3-hydroxypropyl) siloxane]-graft poly(ethylene/propylene glycol) methyl ether; poly[dimethylsiloxane-co-methyl(3-hydroxypropyl)siloxane]-graft-tetrakis(1,2-butylene glycol); poly(dimethylsiloxane-co-alkylmethylsiloxane); poly[dimethylsiloxane-co-methyl(stearoyloxyalkyl)siloxane]; poly[dimethylsiloxane-co-methyl(3-hydroxypropyl)siloxane]-graft-poly(ethylene/propylene glycol); poly[dimethylsiloxane-co-methyl(3-hydroxypropyl)siloxane]-graft-poly(ethylene glycol) [3-(trimethylammonio)propyl chloride; poly[dimethylsiloxane-co-methyl(3-hydroxypropyl)siloxane]-graft-poly(ethylene glycol) 3-aminopropyl ether; poly[dimethylsiloxane-co-methyl(3,3,3-trifluoropropyl)siloxane]; poly(dimethylsiloxane bis[[3-[(2-aminoethyl)amino]propyl]dimethoxysilyl]ether; poly(dimethylsiloxane) ethoxylate/propoxylated; or a combination comprising at least one of the foregoing silicone compounds.

8. A glass or plastic article having an anti-fogging surface comprising:
a glass or plastic substrate; and
an anti-fog coating disposed on at least one surface of the substrate, the anti-fog coating comprising a silicone compound free of a sulfonic acid function group; a water dispersible polyurethane compound; and water, wherein the silicone compound is of the formula:

wherein the subscripts a, c, d, e, f, and g are zero or a positive integer, subject to the limitation that the sum of the subscripts b, d, and f is one or greater, M has the formula: $R^1{}_3SiO_{1/2}$, wherein each $R^1$ is independently a monovalent hydrocarbon radical having from one to forty carbon atoms; M' has the formula: $R^2{}_{3-h}R^3{}_hSiO_{1/2}$, wherein each $R^2$ and $R^3$ are independently monovalent hydrocarbon radicals having from one to forty carbon atoms, and the subscript h is 1, 2, or 3; D has the formula: $R^4{}_2SiO_{2/2}$, wherein each $R^4$ is independently a monovalent hydrocarbon radical having from one to forty carbon atoms; D' has the formula: $R^5{}_{2-i}R^6{}_iSiO_{2/2}$, wherein each of $R^5$ and $R^6$ is independently a monovalent hydrocarbon radical having from one to forty carbon atoms, and the subscript i is 1 or 2; T has the formula: $R^7SiO_{3/2}$, wherein each $R^7$ is a monovalent hydrocarbon radical having from one to forty carbon atoms; T' has the formula: $R^8SiO_{3/2}$, wherein $R^8$ is a monovalent hydrocarbon radical having from one to forty carbon atoms; and Q has the formula: $SiO_{4/2}$, or an ionic or nonionic siloxane alkoxylate of the formula:

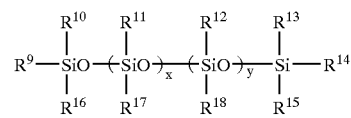

wherein each of $R^{9-17}$ are independently a monovalent hydrocarbon radical, $R^{18}$ is of th general formula: $R^{19}$—Z—$(C_mH_{(2m-1)}R^{20}O)_j(C_nH_{2n}O)_kR^{21}$, m and n are integers greater than or equal to 0; j and k are integers greater than or equal to 0. subject to the proviso that the sum of j+k is greater then or equal to 1; Z is —O—, —S—, —CO—, —NH—, or —NH$_2$—; $R^{19}$ is a divalent hydrocarbylene radical, $R^{20}$ and $R^{21}$ are independently hydrogen, alkyl, hydroxyalkyl, amino, amide, amineoxide, cyano, isocyano, aryl, arylene, carboxy, alkoxy, halogen, haloalkyl, haloalkoxy, sulfo, sulfamo, phosphono, salts thereof, or a combination comprising at least one of the foregoing and wherein x and y are integers greater than or equal to 0, subject to the proviso that x+y is greater than or equal to 1.

9. The article of claim 8, wherein the plastic substrate comprises polycarbonate, cellulose esters, polystyrene, polyvinyl acetate, polyolefins, or polyester.

10. The coating composition according to claim 8, wherein the silicone compound is poly[dimethylsiloxane-co-methyl(3-hydroxypropyl)siloxane]-graft-poly(ethylene glycol)methyl ether; poly[dimethylsiloxane-co-[3-[2-(2-hydroxyethoxy)ethoxy]propyl]methylsiloxane; poly[dimethylsiloxane-co-(3-aminopropyl)methylsiloxane]; poly[dimethylsiloxane-co-methyl(3-hydroxypropyl) siloxane]-graft poly(ethylene/propylene glycol) methyl ether, poly[dimethylsiloxane-co-methyl(3-hydroxypropyl)

siloxane]-graft-tetrakis(1,2-butylene glycol); poly(dimethylsiloxane-co-alkylmethylsiloxane); poly[dimethylsiloxane-co-methyl(stearoyloxyalkyl)siloxane]; poly[dimethylsiloxane-co-methyl(3-hydroxypropyl)siloxane]-graft-poly(ethylene/propylene glycol); poly[dimethylsiloxane-co-methyl(3-hydroxypropyl)siloxane]-graft-poly(ethylene glycol) [3-(trimethylammonio)propyl chloride; poly[dimethylsiloxane-co-methyl(3-hydroxypropyl)siloxane]-graft-poly(ethylene glycol) 3-aminopropyl ether; poly[dimethylsiloxane-co-methyl(3,3,3-trifluoropropyl)siloxane]; poly(dimethylsiloxane bis[[3-[(2-aminoethyl)amino]propyl]dimethoxysilyl] ether; poly(dimethylsiloxane) ethoxylate/propoxylated; or a combination comprising at least one of the foregoing silicone compounds.

* * * * *